United States Patent
Yamaguchi et al.

(10) Patent No.: US 7,579,732 B2
(45) Date of Patent: Aug. 25, 2009

(54) INSULATING MOTOR HOUSING

(75) Inventors: Shinji Yamaguchi, Nerima-ku (JP);
Yoshikazu Tanaka, Nerima-ku (JP);
Masafumi Sugawara, Chiyoda-ku (JP);
Hiroyuki Kinugawa, Chiyoda-ku (JP)

(73) Assignees: Mitsubishi Cable Industries, Ltd.,
Tokyo (JP); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/947,274

(22) Filed: Nov. 29, 2007

(65) Prior Publication Data
US 2008/0150377 A1    Jun. 26, 2008

(30) Foreign Application Priority Data
Dec. 25, 2006  (JP) ............................. 2006-347726

(51) Int. Cl.
*H02K 5/22* (2006.01)

(52) U.S. Cl. .......................................... 310/71; 310/43

(58) Field of Classification Search ................... 310/71, 310/43, 45
See application file for complete search history.

(56) References Cited

U.S. PATENT DOCUMENTS 5,770,902 A * 6/1998 Batten et al. .................. 310/71
6,011,339 A * 1/2000 Kawakami .................. 310/208

FOREIGN PATENT DOCUMENTS

JP  2000-224801 A  8/2000
JP  2002-153004 A  5/2002

* cited by examiner

*Primary Examiner*—Dang D Le
(74) *Attorney, Agent, or Firm*—Roberts Mlotkowski Safran & Cole, P.C.; Thomas W. Cole

(57) ABSTRACT

An insulating motor housing includes first to fourth power supply elements stacked in their thickness direction to be spaced and insulated from each other and integrated with a housing body by insert molding. A power source connector using power source terminals of the second to fourth power supply elements as connector terminals is also integrated with the housing body.

8 Claims, 7 Drawing Sheets

INSULATING MOTOR HOUSING

CROSS-REFERENCE TO RELATED APPLICATION

This non-provisional application claims priority under 35 U.S.C. §119(a) of Japanese Patent Application No. 2006-347726 filed in Japan on Dec. 25, 2006, the entire contents of which are hereby incorporated by reference.

BACKGROUND OF THE INVENTION

1. Field of the Invention

The present invention relates to an insulating motor housing.

2. Description of Related Art

Three-phase motors having motor coils assigned to three phases (U-phase, V-phase and W-phase) have been known (cf. Japanese Unexamined Patent Publication No. 2002-153004). Likewise, insulating housings for three-phase motors having terminals serving as power supply elements for supplying power to the motor coils of the three-phase motor have also been known (cf. Japanese Unexamined Patent Publication No. 2000-224801).

Japanese Unexamined Patent Publication No. 2000-224801 discloses an insulating housing including terminals of three kinds, two insulating plates arranged between the terminals and a housing body provided with a groove. The terminals and the insulating plates are alternately stacked in the groove formed in the housing.

SUMMARY OF THE INVENTION

In the conventional insulating motor housings, resin plates are used for insulation between the terminals of different phases. Therefore, the number of components is increased. As extra cost is required for equipment for manufacturing the resin plates (e.g., molds), product cost is hard to reduce. Further, an additional step of assembling the terminals and the resin plates in the housing body is a burden to workers.

For example, for an insulating motor housing configured to achieve power supply via power supply wires connected to contacts of the terminals using screws or the like, an additional step of assembling the power supply wires to the terminals is required. This is also a burden to the workers.

In view of the above-described circumstances, the present invention has been achieved. An object of the present invention is to reduce the assembling work of the components while the insulation between the power supply elements is ensured and simplify the power supply from an external power source to the motor.

Thus, a first aspect of the present invention is directed to an insulating motor housing including: a plurality of power supply elements each of which is made of flat conductive metal and provided with a power source terminal for connection to a power source and a plurality of coil terminals for energizing motor coils; and a resin housing body for holding the power supply elements, wherein the power supply elements are stacked in the housing body in their thickness direction to be spaced and insulated from each other and integrated with the housing body by insert molding, a power source connecter for supplying power to the power source terminals of the power supply elements is integrated with the housing body and the power source terminals of the power supply elements functions as connector terminals of the power source connector.

According to a second aspect of the present invention, electrical component terminals for connection to an electrical component are integrated with the housing body by insert molding and an electrical component connector for connection to a controller of the electrical component is integrated with the housing body. The electrical component terminals function as connector terminals of the electrical component connector.

According to a third aspect of the present invention, electrical component terminals for connection to an electrical component are integrated with the housing body by insert molding. The power source connector is configured as a dual-purpose connector for supplying power and connecting the controller of the electrical component and the power source terminals. The electrical component terminals function as connector terminals of the dual-purpose connector.

According to a fourth aspect of the present invention, the power supply elements consist of ring-shaped elements and the power source terminals of the power supply elements penetrate holes of the ring-shaped power supply elements and protrude from the power supply elements in the stacking direction of the power supply elements.

According to a fifth aspect of the present invention, the ends of the coil terminals of the power supply elements protrude radially outward from outer rims of the power supply elements.

According to a sixth aspect of the present invention, the ends of the power source terminals of the power supply elements are bent outward in the radial direction of the power supply elements to protrude from the outer rims of the power supply elements.

According to a seventh aspect of the present invention, the power supply elements include a first power supply element consisting of a ring-shaped element and having a plurality of coil terminals protruding radially outward from an outer rim of the first power supply element and second to fourth power supply elements consisting of ring-shaped elements and being sequentially stacked to be spaced from the first power supply element and insulated from each other. Each of the second to fourth power supply elements includes a power source terminal extending upward in the stacking direction from part of an inner rim of the power supply element and a plurality of coil terminals extending downward from an outer rim of the power supply element, being bent radially outward at its end on a level perpendicular to the stacking direction and flush with the coil terminal of the first power supply element and being arranged to have different phases.

According to an eighth aspect of the present invention, each of the power supply elements is a one-piece component and does not have any joints.

As described above, according to the insulating motor housing of the present invention, a plurality of power supply elements are stacked in the housing body and integrated with the housing body by insert molding. This eliminates the step of assembling them. Therefore, the burden to the workers is effectively reduced.

Further, since the power supply connector is integrated with the housing body, power is easily supplied to the insulating motor housing by merely inserting a power source plug into the power source connector of the housing body. Therefore, the burden to the workers is effectively reduced.

DETAILED DESCRIPTION OF THE INVENTION

Hereinafter, embodiments of the present invention will be described with reference to the drawings. The following embodiments are preferred illustrations and do not intend to limit the present invention, its application and the scope of use of the invention.

First Embodiment

Figure 1:
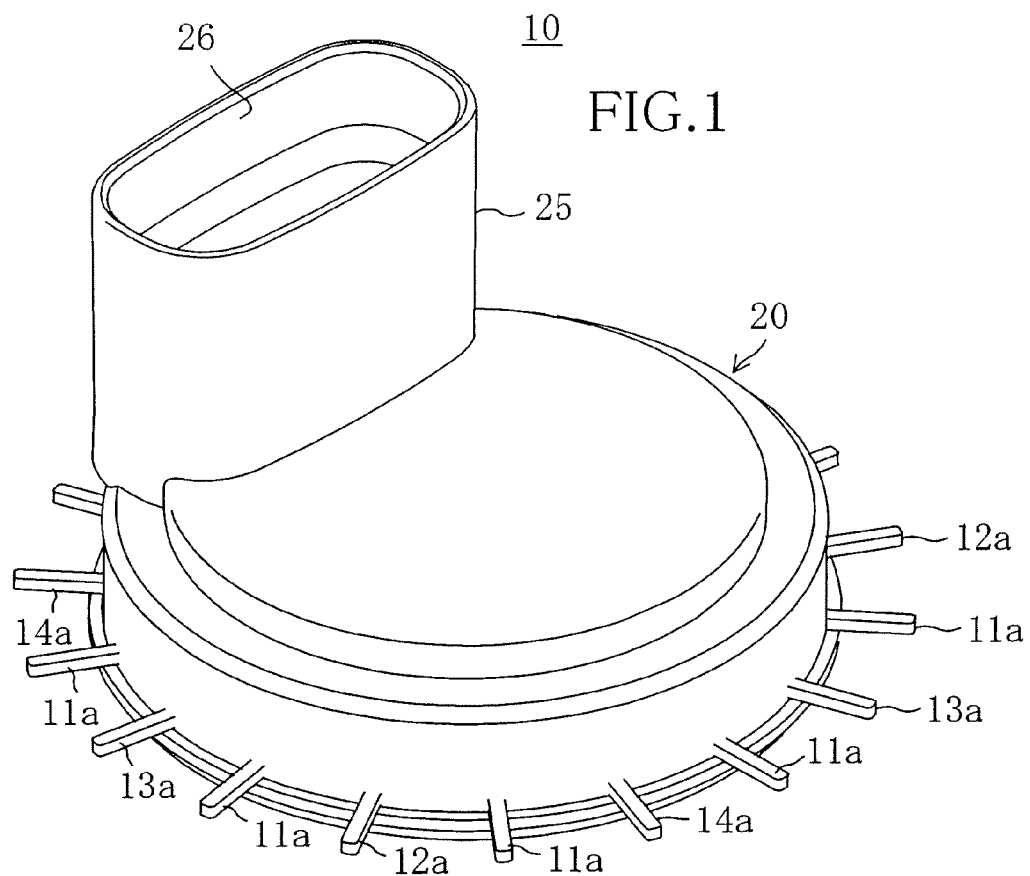
FIG. 1 is a perspective view illustrating the general structure of an insulating motor housing of a first embodiment of the present invention.
Figure 2:
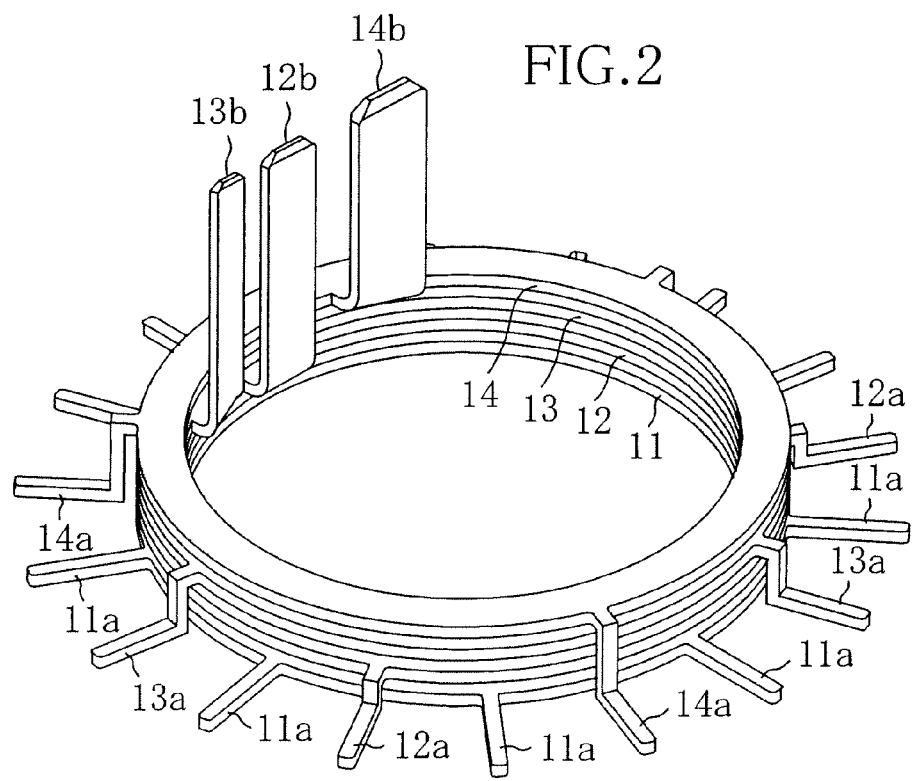
FIG. 2 is a perspective view illustrating the structure of power supply elements of the insulating motor housing of the first embodiment.

FIG. 1 is a perspective view illustrating the general structure of an insulating motor housing of a first embodiment of the present invention and FIG. 2 is a perspective view illustrating the structure of power supply elements of the insulating motor housing. As shown in FIGS. 1 and 2, an insulating motor housing 10 includes first to fourth power supply elements 11 to 14 which are made of flat conductive metal (e.g., copper) and provided with power source terminals 12b to 14b for connection to a power source and a plurality of coil terminals 11a to 14a for energizing motor coils and a resin housing body 20 for holding the first to fourth power supply elements 11 to 14.

The first power supply element 11 consists of a ring-shaped element and has a plurality of coil terminals 11a protruding radially outward from its outer rim.

The second to fourth power supply elements 12 to 14 also consist of ring-shaped elements, respectively, and are sequentially stacked to be spaced from the first power supply element 11 and insulated from each other. The second to fourth power supply elements 12 to 14 are provided with the power source terminals 12b to 14b and the plurality of coil terminals 12a to 14a, respectively. Each of the power source terminals 12b to 14b extends upward in the stacking direction from part of an inner rim of the corresponding ring-shaped power supply element. The plurality of coil terminals 12a to 14a extend downward in the stacking direction from the outer rim of the corresponding ring-shaped power supply element and their ends are bent radially outward on a level perpendicular to the stacking direction and flush with the coil terminal 11a of the first power supply element 11. The coil terminals 12a to 14a are arranged to have different phases.

The power source terminals 12b to 14b of the second to fourth power supply elements 12 to 14 penetrate the holes in the second to fourth power supply elements 12 to 14 to protrude upward in the stacking direction from the power supply elements. As the power source terminals 12b to 14b are routed in space in the holes of the ring-shaped power supply elements, the space is used efficiently and upsizing of the housing body 20 is avoided.

The phases of the coil terminals 11a to 14a are varied from each other on the same level perpendicular to the stacking direction. For example, their phases are varied by 20° as shown in FIG. 2. The coil terminals 14a, 13a and 12a are electrically connected to ones of the ends of a U-phase coil, a W-phase coil and a V-phase coil, respectively, and the other ends of the U-phase coil, W-phase coil and V-phase coil are connected to the coil terminals 11a to establish star connection. Although the star connection is employed in the first embodiment, the present invention is not limited thereto and other connections such as delta connection may be used.

Each of the first to fourth power supply elements 11 to 14 is a one-piece component and does not have any joints. They are formed by cutting a single flat material by pressing, laser processing or wire-EDM. Since the first to fourth power supply elements 11 to 14 are one-piece components, power transmission loss at the joints does not occur and power is transmitted more efficiently as compared with the first to fourth power supply elements 11 to 14 to which the power source terminals 12b to 14b and the coil terminals 11a to 14a are welded. This is also applied to the following embodiments.

The first to fourth power supply elements 11 to 14 are plated with tin, zinc, gold or silver. For example, if connector terminals of a power source plug and wires of motor coils are tin-plated, the first to fourth power supply elements 11 to 14 are also tin-plated. This prevents ionization of electrons that occurs when materials having different ionization tendencies are brought into contact. As a result, the first to fourth power supply elements 11 to 14 are improved in resistance against corrosion. This is also applied to the following embodiments.

The first to fourth power supply elements 11 to 14 are stacked in the housing body 20 in their thickness direction to be spaced and insulated from each other and integrated with the housing body 20 by insert molding. Further, a power source connector 25 for supplying power to the power source terminals 12b to 14b of the second to fourth power supply elements 12 to 14 is also integrated with the housing body 20. The power source terminals 12b to 14b of the second to fourth power supply elements 12 to 14 function as connector terminals of the power source connector 25.

The ends of the coil terminals 11a to 14a of the first to fourth power supply elements 11 to 14 protrude radially outward from the outer rims of the power supply elements 11 to 14.

The power source connector 25 is provided with a connector insertion hole 26 opened upward in the stacking direction of the first to fourth power supply elements 11 to 14. When a power source plug is inserted in the connecter insertion hole 26 of the power source connecter 25, the insulating motor housing 10 is energized via the power source terminals 12b to 14b serving as the connecter terminals.

The housing body 20 is a one-piece component made of synthetic resin, such as polyamide-based, polyacetal-based, polycarbonate-based, polybutylene terephthalate (PBT)-based or polyphenylene sulfide (PPS)-based plastic resin or thermosetting resin such as phenol resin.

The top face of the housing body 20 of the first embodiment is closed with a resin. However, the present invention is not limited thereto. An opening may be formed in part of the top face such that distortion by deformation of the resin is absorbed by the opening.

In the insulating motor housing 10 of the first embodiment, the first to fourth power supply elements 11 to 14 are stacked in the housing body 20 and integrated with the housing body 20 by insert molding. As a result, resin fills the space between the power supply elements 11 to 14 to insulate them from each other. Therefore, insulating plates that have conventionally been interposed between the power supply elements 11 to 14 are no longer necessary. Thus, the number of components is reduced and cost is reduced. Further, as the power supply elements 11 to 14 are integrated with the housing body 20, the step of assembling them is eliminated and the burden to the workers is effectively reduced.

The power supply connecter 25 is also integrated with the housing body 20. Therefore, power is easily supplied to the insulating motor housing 10 by merely inserting the power source plug into the power source connector 25 of the housing body 20 and the burden to the workers is effectively reduced.

Second Embodiment

Figure 3:
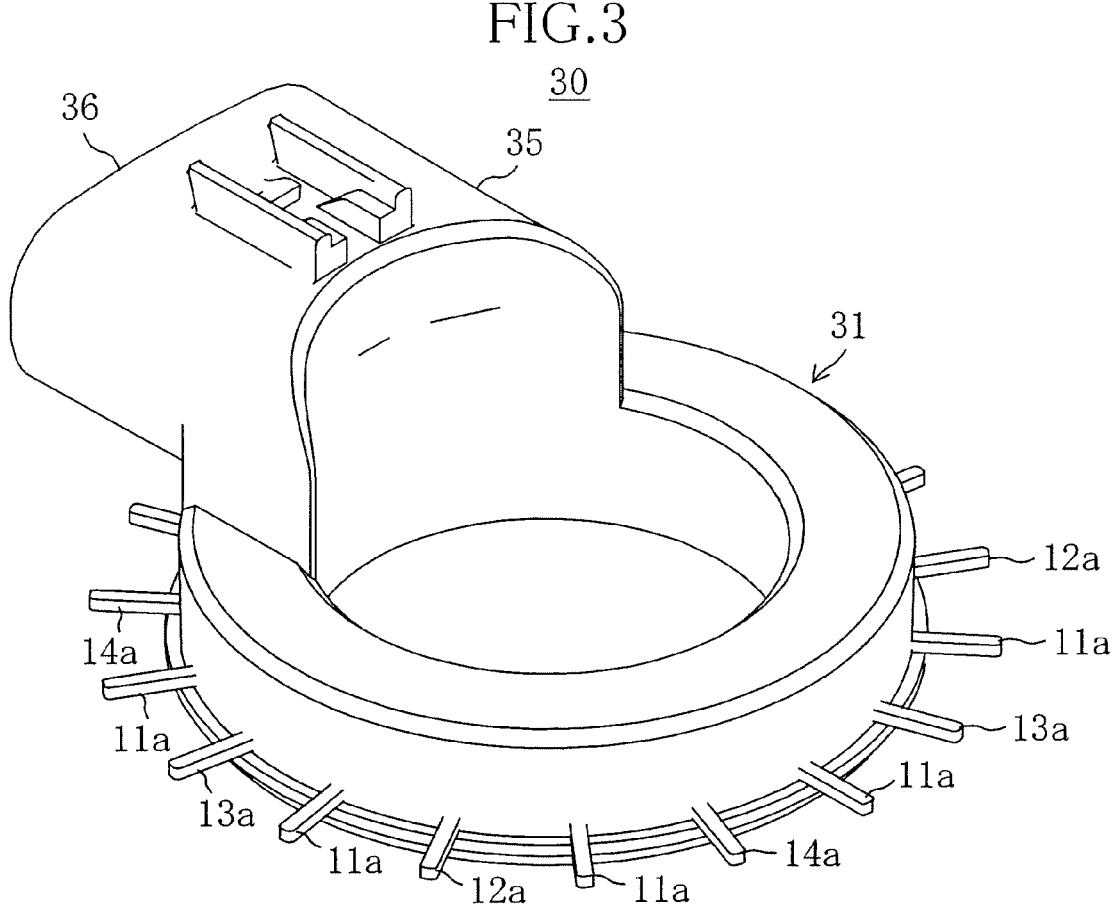
FIG. 3 is a perspective view illustrating the general structure of an insulating motor housing of a second embodiment.
Figure 4:
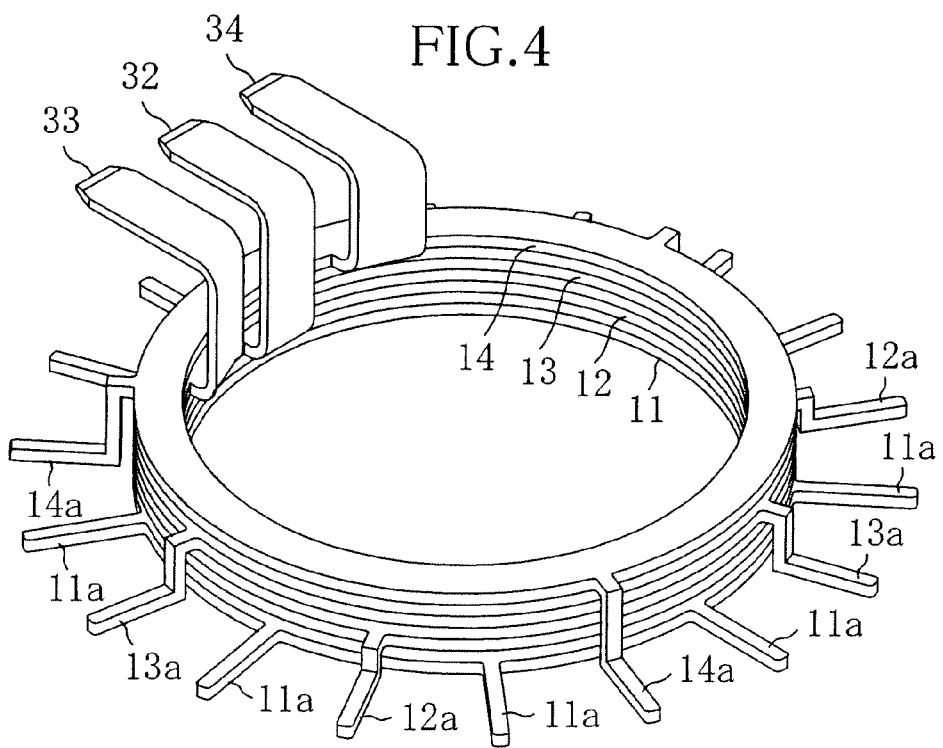
FIG. 4 is a perspective view illustrating the structure of power supply elements of the insulating motor housing of the second embodiment.

FIG. 3 is a perspective view illustrating the general structure of an insulating motor housing of a second embodiment and FIG. 4 is a perspective view illustrating the structure of power supply elements of the insulating motor housing.

The second embodiment is different from the first embodiment in that a connecter insertion hole 36 of the power source connector 35 is opened outward in the radial direction of a motor. The same components as those of the first embodiment are indicated by the same reference numerals and only the difference will be explained below.

As shown in FIGS. 3 and 4, just like the insulating motor housing 10 of the first embodiment, an insulating motor housing 30 includes first to fourth power supply elements 11 to 14 stacked in a housing body 31 in their thickness direction to be insulated from each other and integrated with the housing body 31 by insert molding.

The ends of power source terminals 32 to 34 of the second to fourth power supply elements 12 to 14 penetrate the holes in the second to fourth power supply elements 12 to 14 to protrude from the power supply elements in the stacking direction and are bent radially outward to protrude from the outer rims of the power supply elements 12 to 14.

A power source connector 35 for supplying power to the power source terminals 32 to 34 of the second to fourth power supply elements 12 to 14 is also integrated with the housing body 31. The power source terminals 32 to 34 of the second to fourth power supply elements 12 to 14 function as connecter terminals of the power source connector 35. The housing body 31 is configured to penetrate the holes of the ring-shaped first to fourth power supply elements 11 to 14 in the stacking direction.

The power source connector 35 is provided with a connector insertion hole 36 opened outward in the radial direction of the housing body 31. When a power source plug is inserted in the connector insertion hole 36 of the power source connector 35, the insulating motor housing 30 is energized via the power source terminals 32 to 34 serving as the connecter terminals.

As described above, according to the insulating motor housing 30 of the second embodiment, the first to fourth power supply elements 11 to 14 consist of ring-shaped elements. The power source terminals 32 to 34 penetrate the holes in the second to fourth power supply elements 12 to 14 to protrude upward in the stacking direction from the power supply elements and their ends are bent radially outward to protrude from the outer rims of the power source elements. With this configuration, the power source plug and the power source connector 35 are connected in the radial direction of the motor. Therefore, workability is improved when working space is provided in the radial direction of the motor.

Third Embodiment

Figure 5:
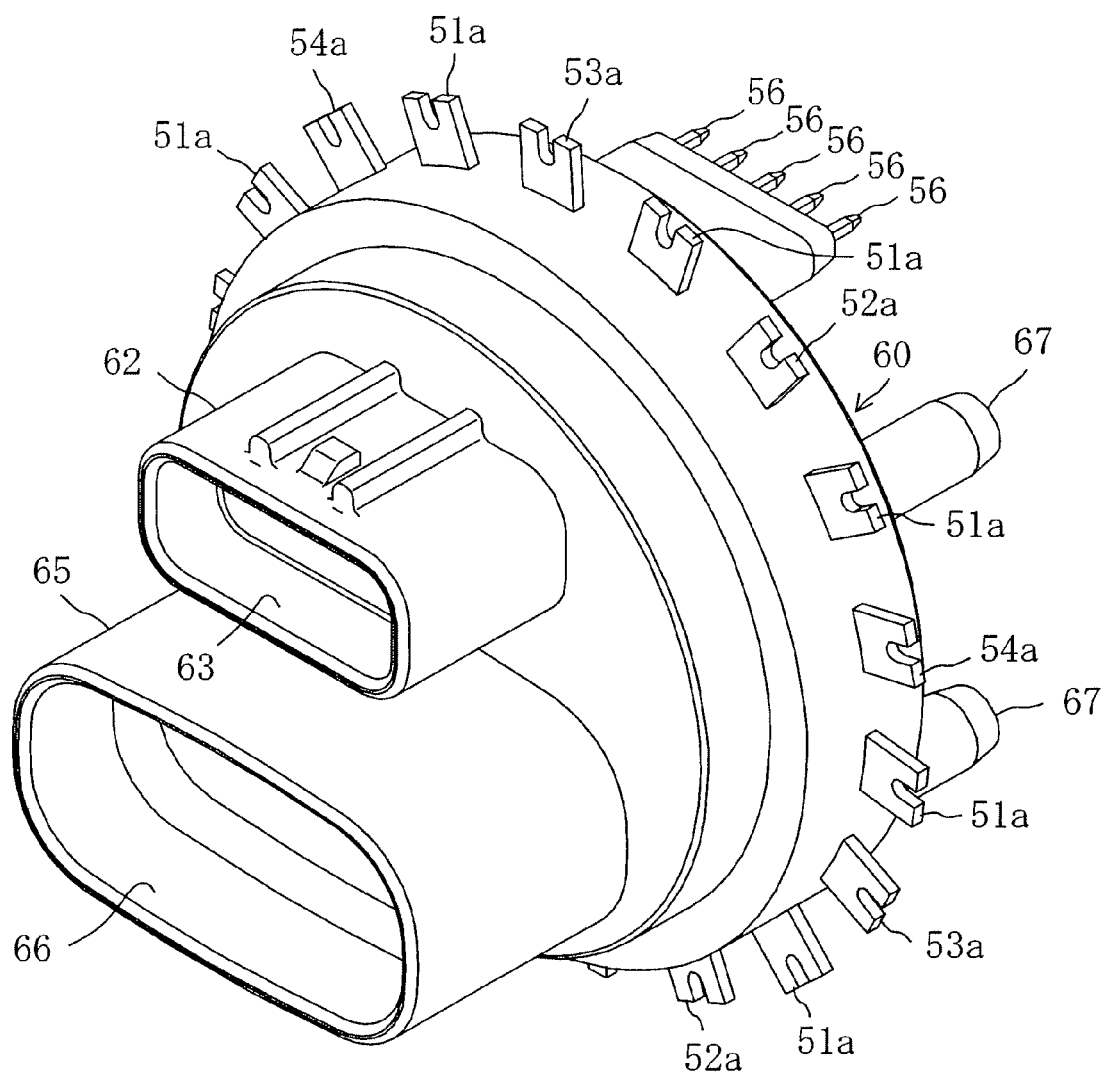
FIG. 5 is a perspective view illustrating the general structure of an insulating motor housing of a third embodiment.
Figure 6:
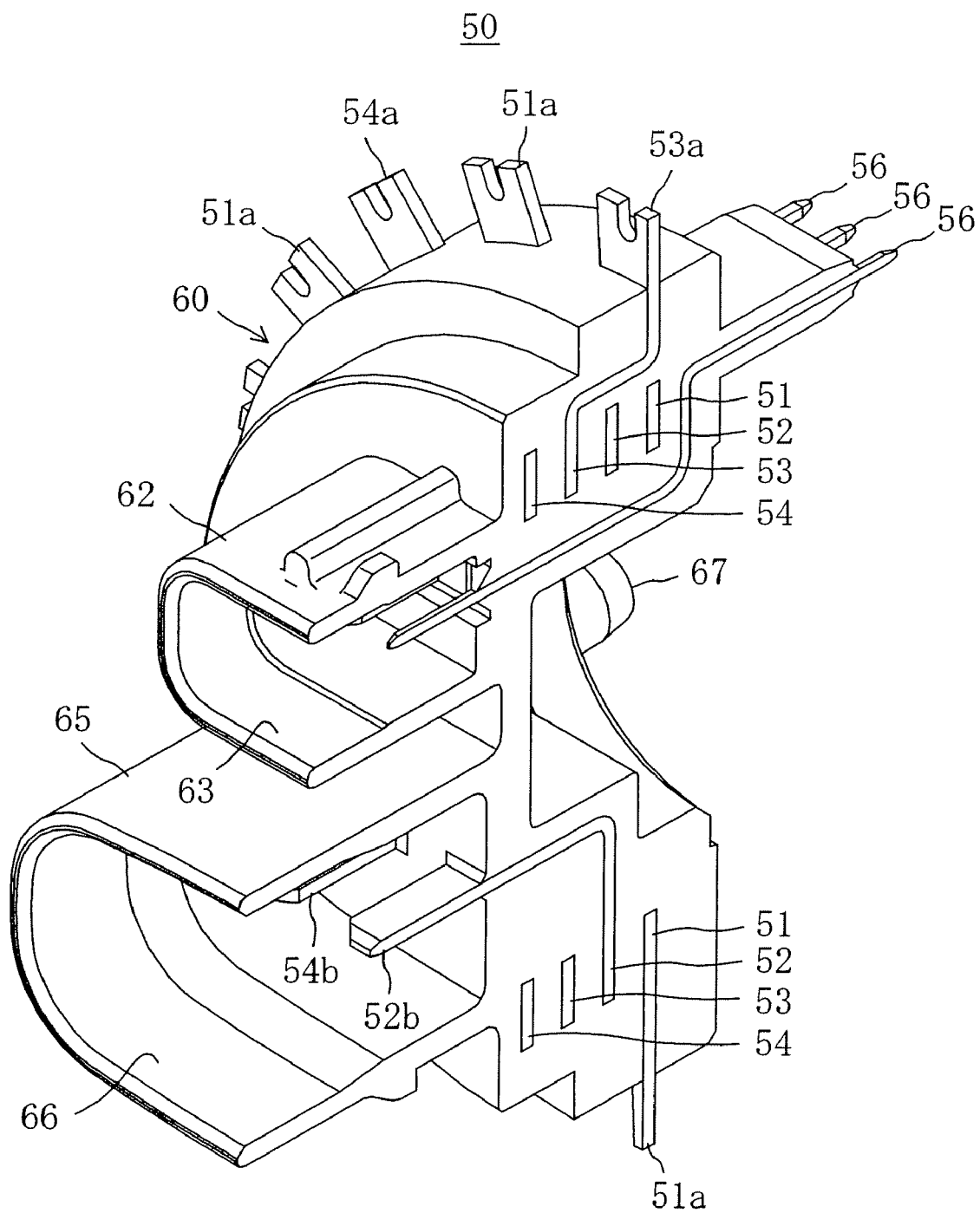
FIG. 6 is a sectional perspective view illustrating the general structure of the insulating motor housing of the third embodiment.
Figure 7:
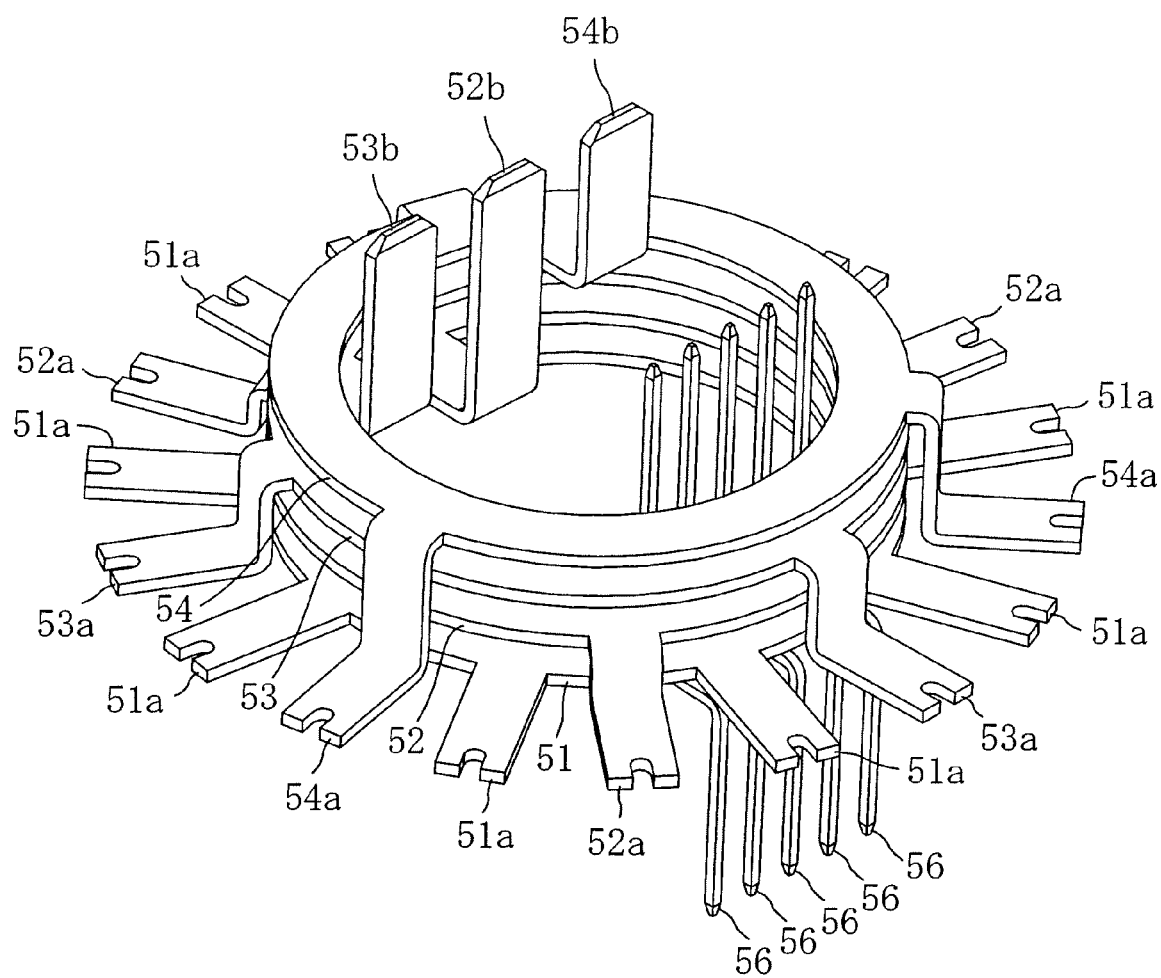
FIG. 7 is a perspective view illustrating the structure of power supply elements of the insulating motor housing of the third embodiment.

FIG. 5 is a perspective view illustrating the general structure of an insulating motor housing of a third embodiment, FIG. 6 is a perspective sectional view of the same and FIG. 7 is a perspective view illustrating the structure of the insulating motor housing.

As shown in FIGS. 5 to 7, an insulating motor housing 50 includes first to fourth power supply elements 51 to 54 which are made of flat conductive metal (e.g., copper) and provided with power source terminals 52b to 54b for connection to a power source and a plurality of coil terminals 51a to 54a for energizing motor coils and a resin housing body 60 for holding the first to power supply elements 51 to 54.

The first power supply element 51 consists of a ring-shaped element and has a plurality of coil terminals 51a protruding radially outward from its outer rim.

The second to fourth power supply elements 52 to 54 also consist of ring-shaped elements, respectively, and are sequentially stacked to be spaced from the first power supply element 51 and insulated from each other. The second to fourth power supply elements 52 to 54 are provided with the power source terminals 52b to 54b and the plurality of coil terminals 52a to 54a, respectively. Each of the power source terminals 52b to 54b extends upward in the stacking direction from part of an inner rim of the corresponding ring-shaped power supply element. The plurality of coil terminals 52a to 54a extend downward in the stacking direction from the outer rim of the corresponding ring-shaped power supply element and their ends are bent radially outward on a level perpendicular to the stacking direction and flush with the coil terminal 51a of the first power supply element 51. The coil terminals 52a to 54a are arranged to have different phases.

The power source terminals 52b to 54b of the second to fourth power supply elements 52 to 54 penetrate the holes in the second to fourth power supply elements 52 to 54 to protrude upward in the stacking direction from the power supply elements.

The phases of the coil terminals 51a to 54a are varied from each other on the same level perpendicular to the stacking direction. For example, their phases are varied by 20° as shown in FIG. 5.

The first to fourth power supply elements 51 to 54 are stacked in the housing body 60 in their thickness direction to be spaced and insulated from each other and integrated with the housing body 60 by insert molding. Further, electrical component terminals 56 for connection to an electrical component such as a sensor provided in the motor are also integrated with the housing body 60 by insert molding.

The electrical component terminals 56 penetrate the holes in the second to fourth power supply elements 52 to 54 to protrude upward in the stacking direction from the power supply elements.

Further, a power source connector 65 for supplying power to the power source terminals 52b to 54b of the second to fourth power supply elements 52 to 54 and an electrical component connector 62 for connection with a controller (not shown) of the electrical component are also integrated with the housing body 60.

The power source terminals 52b to 54b of the second to fourth power supply elements 52 to 54 function as connector terminals of the power source connector 65 and the electrical component terminals 56 function as connector terminals of the electrical component connector 62.

The ends of the coil terminals 51a to 54a of the first to fourth power supply elements 51 to 54 protrude radially outward from the outer rims of the power supply elements 51 to 54. Further, U-shaped notches are formed at the ends of the coil terminals 51a to 54a such that the coil terminals 51a to 54a can be connected to coil wires 71 of motor coils (see FIG. 8).

The electrical component connector 62 has a connector insertion hole 63 opened in the axial direction of the housing body 60. When a connection plug of the controller of the electrical component is inserted in the connector insertion hole 63 of the electrical component connector 62, transmission and receipt of control signals between the controller and the electrical component are carried out via the electrical component terminals 56 serving as the connector terminals.

The power source connector 65 has a connector insertion hole 66 opened in the axial direction of the housing body 60. When a power source plug is inserted in the connector insertion hole 66 of the power source connector 65, the insulating motor housing 50 is energized via the power source terminals 52b to 54b serving as the connecter terminals.

On the side of the housing body 60 opposite the side where the electrical component connector 62 and the power source connector 65 have been formed (the side to be connected to the motor), four engagement pins 67 extending in the axial direction of the housing body 60 for positioning the insulating motor housing 50 with respect to a motor 70 (see FIG. 8) are arranged to be spaced from each other in the circumferential direction of the housing body 60.

Figure 8:
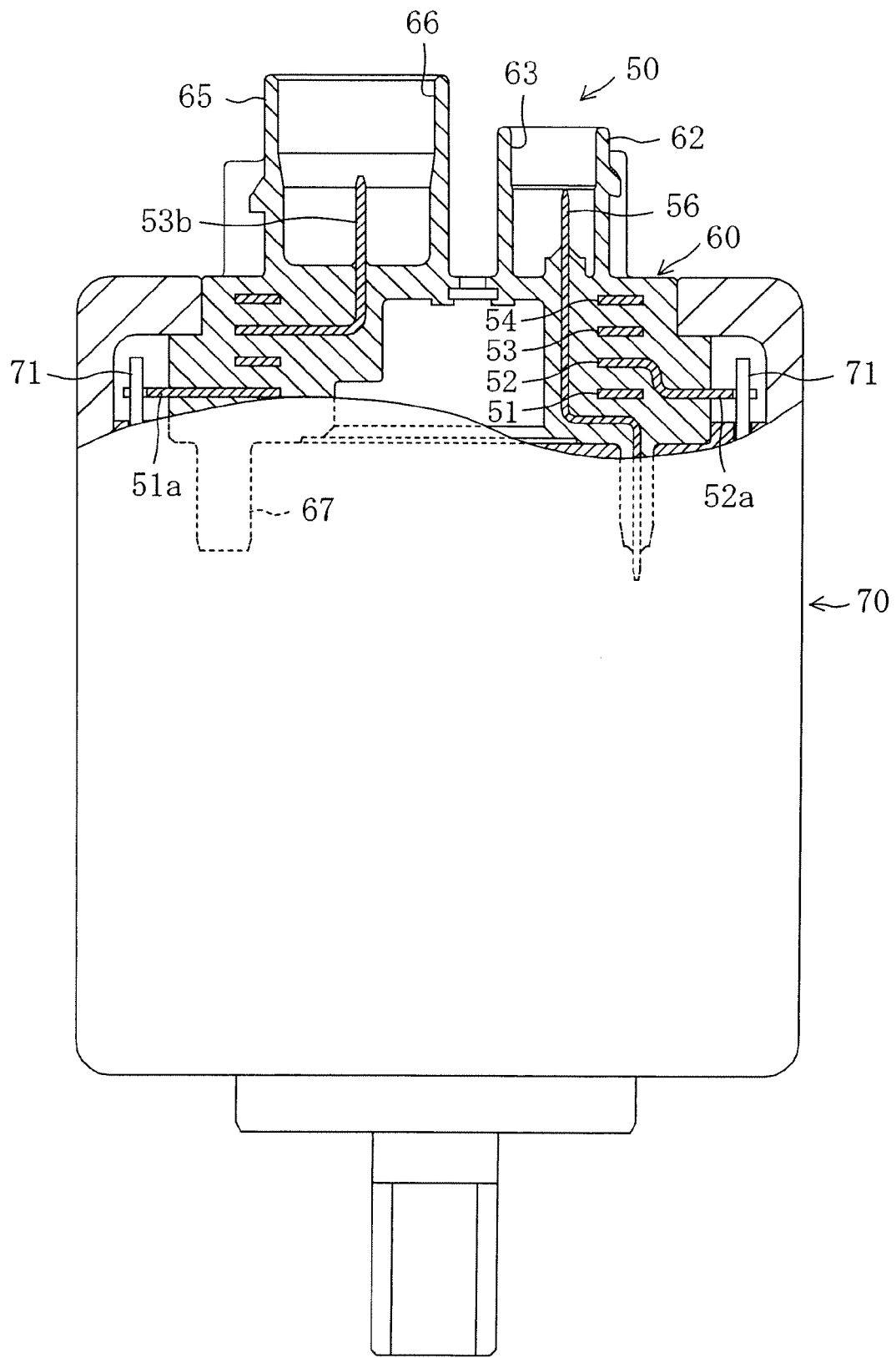
FIG. 8 is a partial cross section illustrating the insulating motor housing of the third embodiment attached to a motor.

FIG. 8 is a partial cross section illustrating the insulating motor housing 50 of the third embodiment attached to the motor 70. As shown in FIG. 8, the coil terminals 51a to 54a are electrically connected to coil wires 71 of motor coils of the motor 70 such that power supplied from the power source is transmitted to the motor 70 via the insulating motor housing 50.

The engagement pins 67 of the housing body 60 are fitted into engagement holes formed in the motor 70. Thus, the insulating motor housing 50 and the motor 70 are suitably positioned and prevented from rattling.

The electrical component terminals 56 are electrically connected to an electrical component provided in the motor 70. Thus, transmission and receipt of control signals are carried out between the controller and the motor 70.

As described above, in the insulating motor housing 50 of the third embodiment, the electrical component terminals 56 are covered with resin. Accordingly, the electrical component terminals 56 are insulated from each other and also from the first to fourth power supply elements 51 to 54. This eliminates the need of inserting insulating plates between the electrical component terminals 56 and the number of components is effectively reduced.

Since the electrical component connector 62 is integrated with the housing body 60, the electrical component and the controller are easily connected to each other by merely inserting the connection plug of the controller in the electrical component connector 62. As a result, the burden to the workers is effectively reduced.

Figure 9:
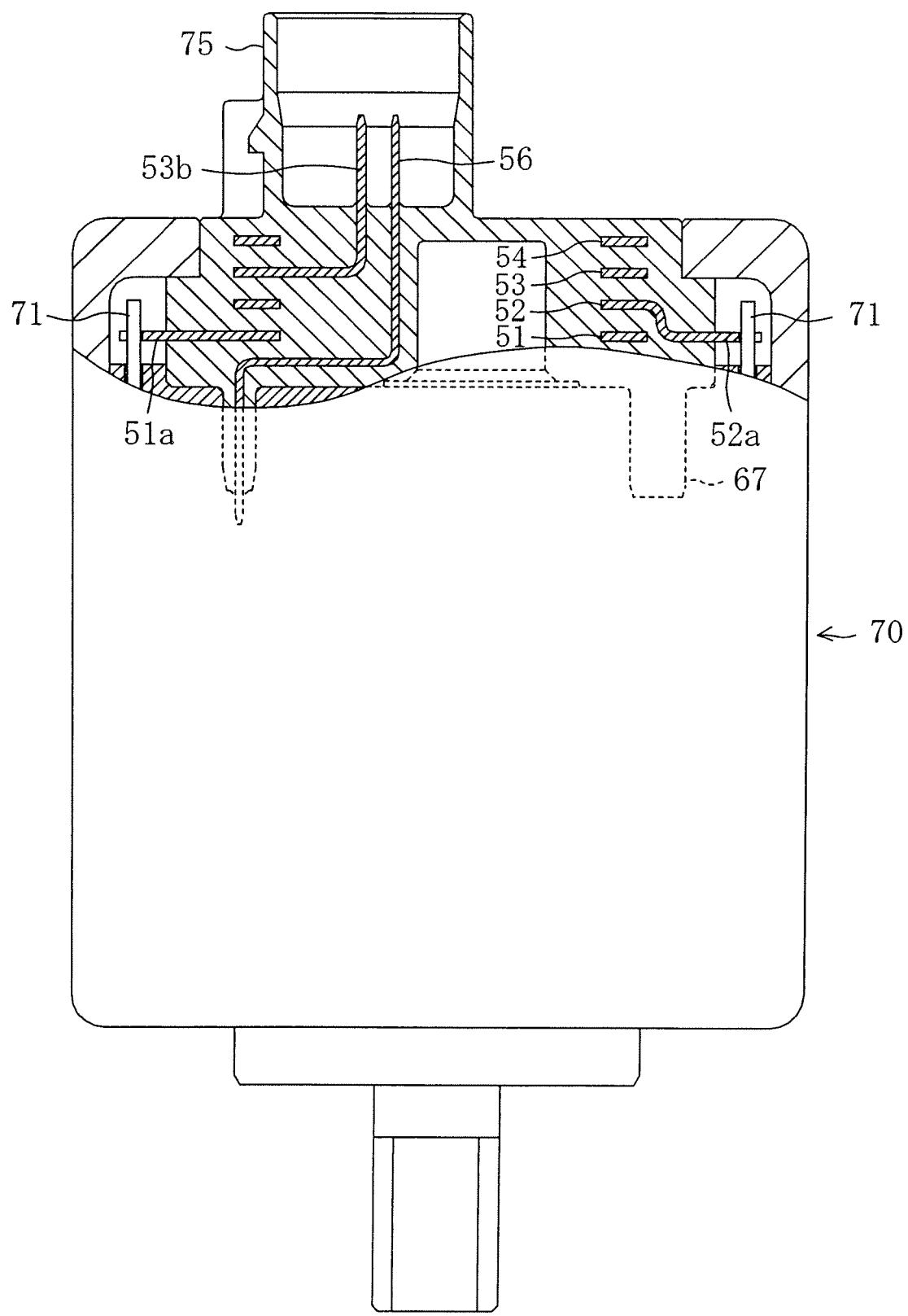
FIG. 9 is a partial cross section illustrating another insulating motor housing attached to the motor.

In the third embodiment, the 3-pin power source connector 65 and the 5-pin electrical component connector 62 are provided separately in the housing body 60. However, the present invention is not limited thereto. For example, as shown in FIG. 9, an 8-pin dual-purpose power source/electrical component connector 75 having 3 pins of the power source terminals 52b to 54b and 5 pins of the electrical component terminals 56 may be provided. When a single connection plug integrated with the power source plug and the connection plug of the controller is inserted in the dual-purpose connector 75, the power supply and the control of the electrical component are easily carried out and the burden to the workers is effectively reduced. This is more cost-effective as compared with the separately prepared power source connector and electrical component connector because the required amount of resin is reduced.

As described above, the present invention makes it possible to reduce the assembling work of the components while the insulation between the power supply elements is ensured and simplify the power supply from the external power source to the motor. Thus, the present invention is highly practical and industrially applicable.

The invention claimed is:

1. An insulating motor housing comprising:
    a plurality of power supply elements each of which is made of flat conductive metal and having an opening, and being provided with a power source terminal for connection to a power source and a plurality of coil terminals for energizing motor coils; and
    a resin housing body for holding the power supply elements and for providing insulating material in a space between adjacent power supply elements,
    wherein the power supply elements are stacked in the housing body in their thickness direction to be spaced and insulated from each other by said insulating material and integrated with the housing body by insert molding, such that said insulating material is an integral portion of the resin housing body, and
    wherein a power source connecter for supplying power to the power source terminals of the power supply elements is integrated with the housing body and the power source terminals of the power supply elements function as connector terminals of the power source connector, and protrude from the openings in the power supply elements in the stacking direction of the power supply elements.

2. The insulating motor housing of claim 1, wherein
    electrical component terminals for connection to an electrical component are integrated with the housing body by insert molding and an electrical component connector for connection to a controller of the electrical component is integrated with the housing body and
    the electrical component terminals function as connector terminals of the electrical component connector.

3. The insulating motor housing of claim 1, wherein
    electrical component terminals for connection to an electrical component are integrated with the housing body by insert molding,
    the power source connector is configured as a dual-purpose connector for supplying power and connecting the controller of the electrical component and
    the power source terminals and the electrical component terminals function as connector terminals of the dual-purpose connector.

4. The insulating motor housing of claim 1, wherein
    the power supply elements consist of ring-shaped elements and
    the power source terminals of the power supply elements penetrate holes of the ring-shaped power supply elements and protrude from the power supply elements in the stacking direction of the power supply elements.

5. The insulating motor housing of claim 4,
    the ends of the coil terminals of the power supply elements protrude radially outward from outer rims of the power supply elements.

6. The insulating motor housing of claim 4, wherein
    the ends of the power source terminals of the power supply elements are bent outward in the radial direction of the power supply elements to protrude from the outer rims of the power supply elements.

7. The insulating motor housing of claim 1, wherein the power supply elements include a first power supply element consisting of a ring-shaped element and having a plurality of coil terminals protruding radially outward from an outer rim of the first power supply element and second to fourth power supply elements consisting of ring-shaped elements and being sequentially stacked to be spaced from the first power supply element and insulated from each other, each of the second to fourth power supply elements includes a power source terminal extending upward in the stacking direction from part of an inner rim of the power supply element and a plurality of coil terminals extending downward from an outer rim of the power supply element, being bent radially outward at its end on a level perpendicular to the stacking direction and flush with the coil terminal of the first power supply element and being arranged to have different phases.

8. The insulating motor housing of claim 1, wherein each of the power supply elements is a one-piece component and does not have any joints.

* * * * *